(12) United States Patent
Masuda

(10) Patent No.: US 7,665,124 B2
(45) Date of Patent: Feb. 16, 2010

(54) AUTHENTICATION DEVICE

(75) Inventor: Takahiro Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 825 days.

(21) Appl. No.: 11/326,449

(22) Filed: Jan. 6, 2006

(65) Prior Publication Data

US 2006/0206728 A1  Sep. 14, 2006

Related U.S. Application Data

(63) Continuation of application No. PCT/JP03/08611, filed on Jul. 7, 2003.

(51) Int. Cl.
*H04L 9/32* (2006.01)
*H04L 9/00* (2006.01)
(52) U.S. Cl. .................... 726/2; 726/3; 726/27; 726/30
(58) Field of Classification Search ......... 713/167–170, 713/176, 178, 181, 155–156, 161–162, 165; 726/2–4, 26–30
See application file for complete search history.

(56) References Cited

U.S. PATENT DOCUMENTS 5,638,446 A * 6/1997 Rubin ........................ 705/51
6,807,633 B1 * 10/2004 Pavlik ........................ 713/170
2001/0039545 A1  11/2001 Nishizawa

FOREIGN PATENT DOCUMENTS

| JP | 11-154139 | 6/1999 |
| JP | 2001-147984 | 5/2001 |
| JP | 2001-306732 | 11/2001 |

OTHER PUBLICATIONS

"Timestamp authentication Configuration System Package", 2003, Seiko Precision Inc., Searched on May 12, 2003] Internet <http://www,seiko-p.co.jp/systems/time/stamp_m.html>.
International Search Report dated Sep. 2, 2003.

* cited by examiner

*Primary Examiner*—Hosuk Song

(57) ABSTRACT

An authentication device, an authentication method and an authentication program of the present invention reduce a load occurred when registering digest information of a file in an authentication server and a load occurred when demanding authentication, and thus facilitates the authentication. Address information of a registration object file is received, the file on the basis of the address information is acquired, timestamp information of the file is acquired, digest information of the file acquired by a file acquisition module is generated, the digest information and the timestamp information are registered in a file registration module in a way that associates the digest information and the timestamp information with each other, the file is authenticated in response to a demand for authentication by comparing the digest information of the authentication object file with the digest information registered in said file information registration module, and, when authenticated by said authentication module, the timestamp information of the file is outputted.

19 Claims, 6 Drawing Sheets

FIG. 3

| URL | http://www.foo.com/somefile.bin |
|---|---|
| LAST UPDATE TIMESTAMP | 2003-02-01 13:24:51 |
| REGISTRATION TIMESTAMP | 2003-02-01 13:20:42 |
| SUMMARY INFORMATIO | a5 31 fc 2b bb 90 38 |
| comment | NOTHING |

FIG. 6

| URL | http://www.foo.com/somefile.bin |
|---|---|
| LAST UPDATE TIMESTAMP | 2003-02-01 13:24:51 |
| REGISTRATION TIMESTAMP | 2003-02-01 13:20:42 |
| SUMMARY INFORMATION | a5 31 fc 2b bb 90 38 |
| PREVIOUS FILE REGISTRATION TIMESTAMP | 2003-01-01 16:19:32 |
| NEXT FILE REGISTRATION TIMESTAMP | 1970-01-01 00:00:00 |
| comment | CHANGE POINT: GUI-PARTIAL CHANGE |

AUTHENTICATION DEVICE

CROSS-REFERENCE TO RELATED APPLICATION

This is a continuation of Application PCT/JP2003/08611, filed on Jul. 7, 2003, now pending, the contents of which are herein wholly incorporated by reference.

BACKGROUND OF THE INVENTION

The present invention relates to an authentication device, an authentication method and an authentication program that authenticate a timestamp about a file uploaded onto a network.

An electronic document is easy to be copied and falsified, and therefore a variety of authentication methods for verifying its validity are proposed.

For example, such a system is known that a requester transmits a hash value of an object document to an authentication server, and this hash value is registered together with a timestamp, thereby verifying that the very electronic document exists at this timestamp, i.e., that the electronic document is not falsified since this timestamp (refer to Non-Patent document 1).

Proposed further is an electronic voting system enabling judgment as to whether a post-bidding document is falsified as compared with a document at a bidding time by generating and sending a hash value of a bidding document to an certification authority (CA), and the hashed document together with a certificate of the CA is opened to the public on the Internet.

Non-Patent Document 1

Timestamp authentication Configuration Package, 2003 SEIKO Precision Inc. [Searched on May 12, 2003]Internet <http://www.seiko-p.co.jp/systems/time/stamp_m.html>

Patent Document 1

Japanese Patent Application Laid-Open Publication No. 2001-147984

SUMMARY OF THE INVENTION

As in the system disclosed in the Non-Patent document, in the case of verifying whether the document is falsified or not by use of the hash value, the requester side generates and sends the hash value to the certification authority, and therefore a problem is that a load on the side of the requester (sender) is large. Hence, there is a necessity of introducing hardware for this purpose, and a cost expended for the authentication is easy to increase. Further, a terminal limited in terms of hardware resources such as a cellular phone and a PDA (Personal Digital Assistant) was unable to utilize the system.

Similarly, the problem described above also arises in the system disclosed in the Patent document 1, wherein hardware serving as a special bidding terminal is still needed.

Moreover, when authenticating the file located on the network, the file on the network is temporarily downloaded, and a hashed document is required to be generated and sent to the certification authority, wherein the load on the side of the requester increases corresponding to a storage capacity, download time and so on.

The present invention was devised in view of the problems inherent in the prior arts. Namely, it is an object of the present invention to facilitate the authentication by reducing a load occurred when registering digest information of a file in an authentication server and a load occurred when demanding authentication.

The present invention adopts the following configurations in order to obviate the problems.

Namely, an authentication device of the present invention comprises:

an address receiving module receiving address information of a registration object file;

a file acquisition module acquiring the file on the basis of the address information;

a timestamp acquisition module acquiring timestamp information of the file;

a digest generation module generating digest information of the file acquired by the file acquisition module;

a file information registration module registering the digest information and the timestamp information in a way that associates the digest information and the timestamp information with each other;

an authentication module authenticating, in response to a demand for authentication, the file by comparing the digest information of the authentication object file with the digest information registered in the file information registration module; and an authentication result output module outputting, when authenticated by the authentication module, the timestamp information of the file.

Further, an authentication device of the present invention comprises:

a file information registration module registering digest information of a file and timestamp information of the file in a way that associates the digest information and the timestamp information with each other;

an address receiving module receiving address information of an authentication object file;

a file acquisition module acquiring the file on the basis of the address information;

a digest generation module generating digest information of the file acquired by the file acquisition module;

an authentication module authenticating the file by comparing the digest information of the authentication object file with the digest information registered in the file information registration module; and an authentication result output module outputting, when authenticated by the authentication module, the timestamp information of the file.

Still further, an authentication device of the present invention comprises:

an address receiving module receiving address information of a registration object file or an authentication object file;

a file acquisition module acquiring the file on the basis of the address information;

a timestamp acquisition module acquiring timestamp information of the registration object file;

a digest generation module generating digest information of the file acquired by the file acquisition module;

a file information registration module registering the digest information of the registration object file and the timestamp information thereof in a way that associates the digest information and the timestamp information with each other;

an authentication module authenticating the file by comparing the digest information of the authentication object file with the digest information registered in the file information registration module; and an authentication result output module outputting, when authenticated by the authentication module, the timestamp information of the file.

In the authentication device, the file information registration module may store the digest information, the timestamp information and the address information of the registration object file in a way that associates these items of information with each other, and the authentication module may authenticate the file by comparing the digest information registered in the file information registration module in a way that associates the digest information with the same address information as the authentication object file has, with the digest information of the authentication object file.

In the authentication device, the file information registration module may store the digest information, the timestamp information and the address information of the registration object file in a way that associates these items of information with each other, and if the address information of the registration object file has already been registered in the file registration module, history information may be registered together with the address information, the timestamp information and the digest information.

According to the present invention, there is provided an authentication method by which a computer executes:

receiving address information of a registration object file;

acquiring the file on the basis of the address information;

acquiring timestamp information of the file;

generating digest information of the acquired file;

registering the digest information and the timestamp information in a file registration module in a way that associates the digest information and the timestamp information with each other;

authenticating, in response to a demand for authentication, the file by comparing the digest information of the authentication object file with the digest information registered in the file information registration module; and outputting, when authenticated by comparing the digest information, the timestamp information of the file.

Yet further, according to the present invention, there is provided an authentication method by which a computer including a file information registration module registering digest information of a file and timestamp information of the file in a way that associates the digest information and the timestamp information with each other, executes;

receiving address information of an authentication object file;

acquiring the file on the basis of the address information;

generating digest information of the acquired file;

authenticating the file by comparing the digest information of the authentication object file with the digest information registered in a file information registration module;

outputting, when authenticated by comparing the digest information, the timestamp information of the file.

Moreover, according to the present invention, there is provided an authentication method by which a computer executes:

receiving address information of a registration object file or an authentication object file;

acquiring the file on the basis of the address information;

acquiring timestamp information of the registration object file;

generating digest information of the acquired file;

registering the digest information of the registration object file and the timestamp information thereof in a way that associates the digest information and the timestamp information with each other;

authenticating the file by comparing the digest information of the authentication object file with the digest information registered in a file information registration module; and outputting, when authenticated by comparing the digest information, the timestamp information of the file.

Furthermore, in the authentication method, the file information registration module may store the digest information, the timestamp information and the address information of the registration object file in a way that associates these items of information with each other, and the authenticating step may involve authenticating the file by comparing the digest information registered in the file information registration module in a way that associates the digest information with the same address information as the authentication object file has, with the digest information of the authentication object file.

In the authentication method, the file information registration module may store the digest information, the timestamp information and the address information of the registration object file in a way that associates these items of information with each other, and the digest information registering step may involve registering, if the address information of the registration object file has already been registered in the file registration module, history information together with the address information, the timestamp information and the digest information.

Furthermore, the present invention may also be a program making a computer execute the steps described above. Moreover, the present invention may also be a readable-by-computer storage medium stored with such a program.

In the present invention, the timestamp information may be, without being limited to the time, date/time information such as 2003/05/15 14:41 30" and may also be information not strictly specifying year/month and date such as May 2003 and 13:02 and also time zone information (e.g., AM (Ante Meridiem)/PM (Post Meridiem)) such as before noon on 30.

BRIEF DESCRIPTION OF THE DRAWINGS

FIG. 3 is an explanatory diagram of a file information database;

FIG. 6 is a diagram showing an example of a file information DB stored with history information.

DETAILED DESCRIPTION OF THE PREFERRED EMBODIMENT

An embodiment of the present invention will hereinafter be described with reference to the drawings. It should be noted that a configuration of the embodiment is an exemplification, and the present invention is not limited to the configuration of the embodiment.

§1. Whole Architecture

Figure 1:
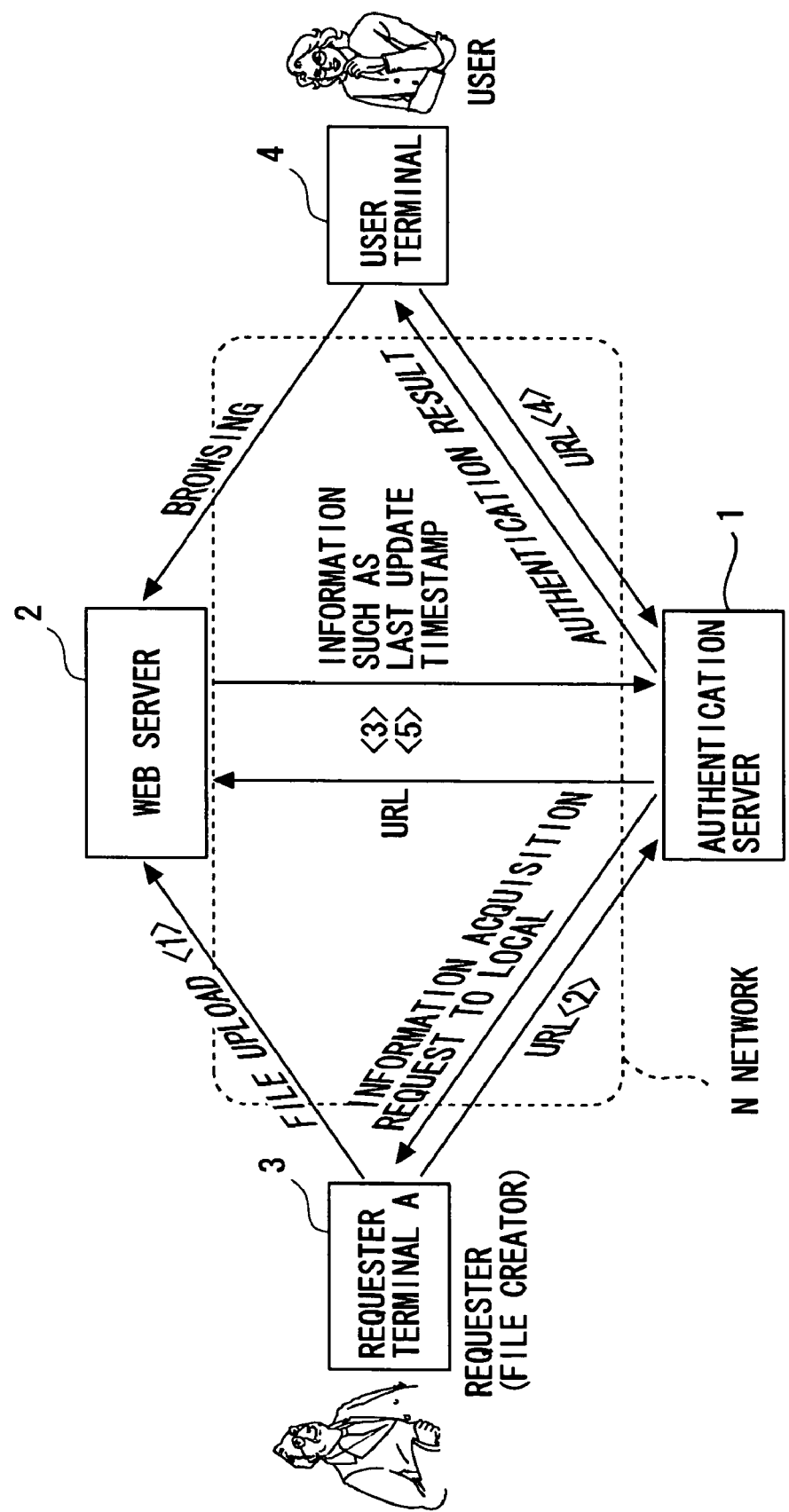
FIG. 1 is a view showing a whole of a system including an authentication device as one embodiment of the present invention.

FIG. 1 is a view showing the whole of a system including an authentication device by way of one embodiment of the present invention.

In the present embodiment, a Web server 2, an authentication server (authentication device) 1, a requester terminal 3 and a user terminal 4 are connected to each other via a network N such as the Internet.

A file creator (requester) uploads files to be opened on the Internet to the Web server 2 from the requester terminal 3, then sends URLs (address information) of the files each requiring the authentication to the authentication server 1, and requests the server 1 to register these authentication-needed files. The authentication server 1 acquires the files attached with these URLs, creates digest summary information (digest information), and stores the files together with timestamp information.

A user, who desires to verify validity of the file, notifies the authentication server 1 of the URL (Uniform Resource Locator) of the file from on the user terminal 4. The authentication server 1 acquires the file based on this URL and authenticates the file by comparing this file with the file information stored on a storage module.

Thus, in the present embodiment, the requester or the user sends the URL of the file to the authentication server 1 from on the individual terminal 3 or 4, thereby enabling utilization of the file authentication.

§2. Explanation of Each Component

Figure 2:
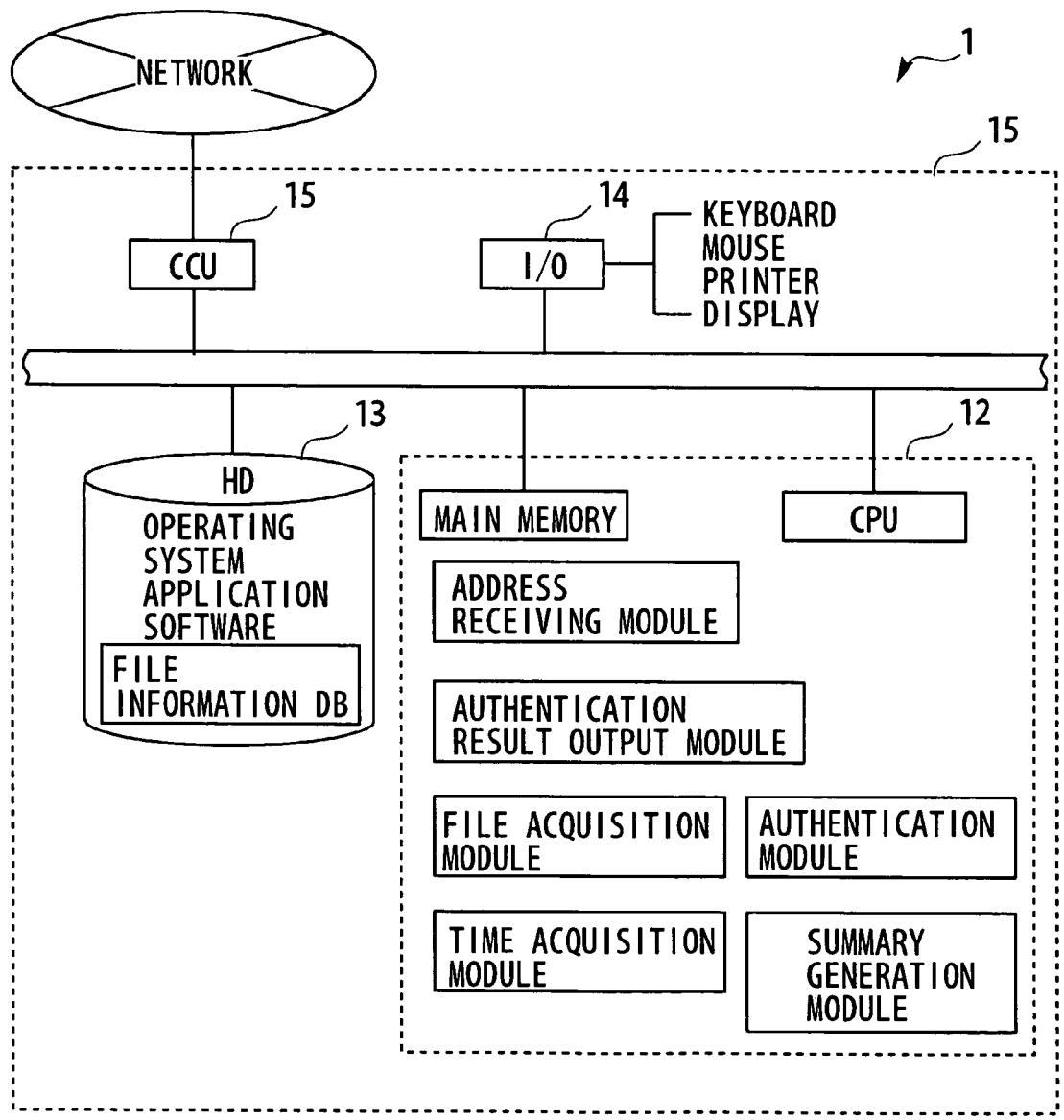
FIG. 2 is a diagram of a configuration of an authentication server 1.

FIG. 2 is a diagram of a configuration of the authentication server 1.

The authentication server 1 is a so-called computer and includes, as shown in FIG. 2, within a main body 11, an arithmetic processing unit 12 constructed of a CPU (Central Processing Unit), a main memory, etc., a storage device (hard disc) 13 stored with data and software for an arithmetic process, an input/output (I/O) unit 14, a communication control unit 15, and so on.

Connected properly to the I/O unit 14 are an input device such as a keyboard and a mouse, an output device such as a display device and a printer, and an interface for transmitting and receiving information to and from other devices.

The communication control unit 15 performs control for transmitting or receiving the information to or from other computers via the network N such as the Internet.

The storage device 13 is preinstalled with an operating system (OS) and application software (an authentication program). Further, within the storage device 13, a file information database (corresponding to a file information registration module, which is also termed a file information DB) stored with the digest information on the files and the timestamp information on the files, is built up. FIG. 3 is an explanatory diagram of the file information DB.

The file information DB is, as shown in FIG. 3, registered with the address information (the URL in this example) specifying a file storage location, the file digest information, the timestamp information about the file and a comment in a way that associates these items with each other. Stored according to the present embodiment as the timestamp information are a date when the file was updated last time on the network, i.e., a last update timestamp (last modified timestamp) and a registration timestamp when acquiring the file on the basis of the address information and then registering the digest information. Further, the digest information is a byte string having a fixed length, which is obtained by processing the file with a hash function (message digest function).

The arithmetic processing unit 12 executes the arithmetic process according to the authentication program, thereby functioning as an address receiving module, a file acquisition module, a timestamp acquisition module, a digest generation module, an authentication module and an authentication result output module.

The arithmetic processing unit 12, as this address receiving module, receives address information of the file of which registration is requested by the requester from the requester terminal 3, or receives an address of the file of which authentication is demanded by the user from the user terminal 4.

The arithmetic processing unit 12, as the file acquisition module, accesses the computer stored with the file on the basis of the address information, and thus acquires the file.

The arithmetic processing unit 12, as the timestamp acquisition module, acquires the timestamp information of the file defined as a registration object.

The arithmetic processing unit 12, as the digest generation module, generates the digest information by processing the file acquired by the acquisition module with a predetermined hash function (such as MD5 (Message Digest 5) and SHA-1 (Secure Hash Algorithm 1), CRC (Cyclic Redundancy Check), Snefu and MD4 (Message Digest 4)).

The arithmetic processing unit 12, as the authentication module, compares the digest information of the file defined as the authentication object with the digest information registered on the file information registration module, and, if coincident with each other, authenticates that the file is identical with the registered document.

The arithmetic processing unit 12, as the authentication result output module, outputs the timestamp information of the file when the authentication module has made the authentication.

The Web server 2 is a general type of computer including a CPU, a main memory, a storage device (hard disc), etc.. The Web server 2 is, within the storage device, provided with storage areas for the individual requesters, and, when receiving the file and the address information specifying the file storage location from the requester terminal 3, stores the file in the storage area having an address specified by the address information. The Web server 2 opens the file stored in this storage area to the public on the network, wherein the file is accessible from other computers via the network N.

Moreover, the requester terminal 3 is a computer including a CPU, a main memory, a communication control unit, etc., and is capable of communications with other computers via the network N. The requester terminal 3 uploads the want-to-open-on-the-network file to the Web server 2. Further, the requester terminal 3 transmits the address information of the registration object file to the authentication server 1.

Note that, in the present embodiment, the Web server 2 and the requester terminal 3 are configured as the separate computers but may also be configured by one single computer. Namely, the requester may get the Web server 2 to store the file wanted to open on the network, and may get the registration object file address information transmitted to the authentication server 1 from the Web server 2.

Furthermore, the user terminal 4 is a general type of computer including a CPU, a main memory, a communication control unit, etc. The user terminal 4 may be, if capable of communicating with other computers via the network N, a terminal limited in terms of hardware resources such as a cellular phone and a PDA (Personal Digital Assistant).

§3. Authentication Method 3-1. Registration Procedure

Figure 4:
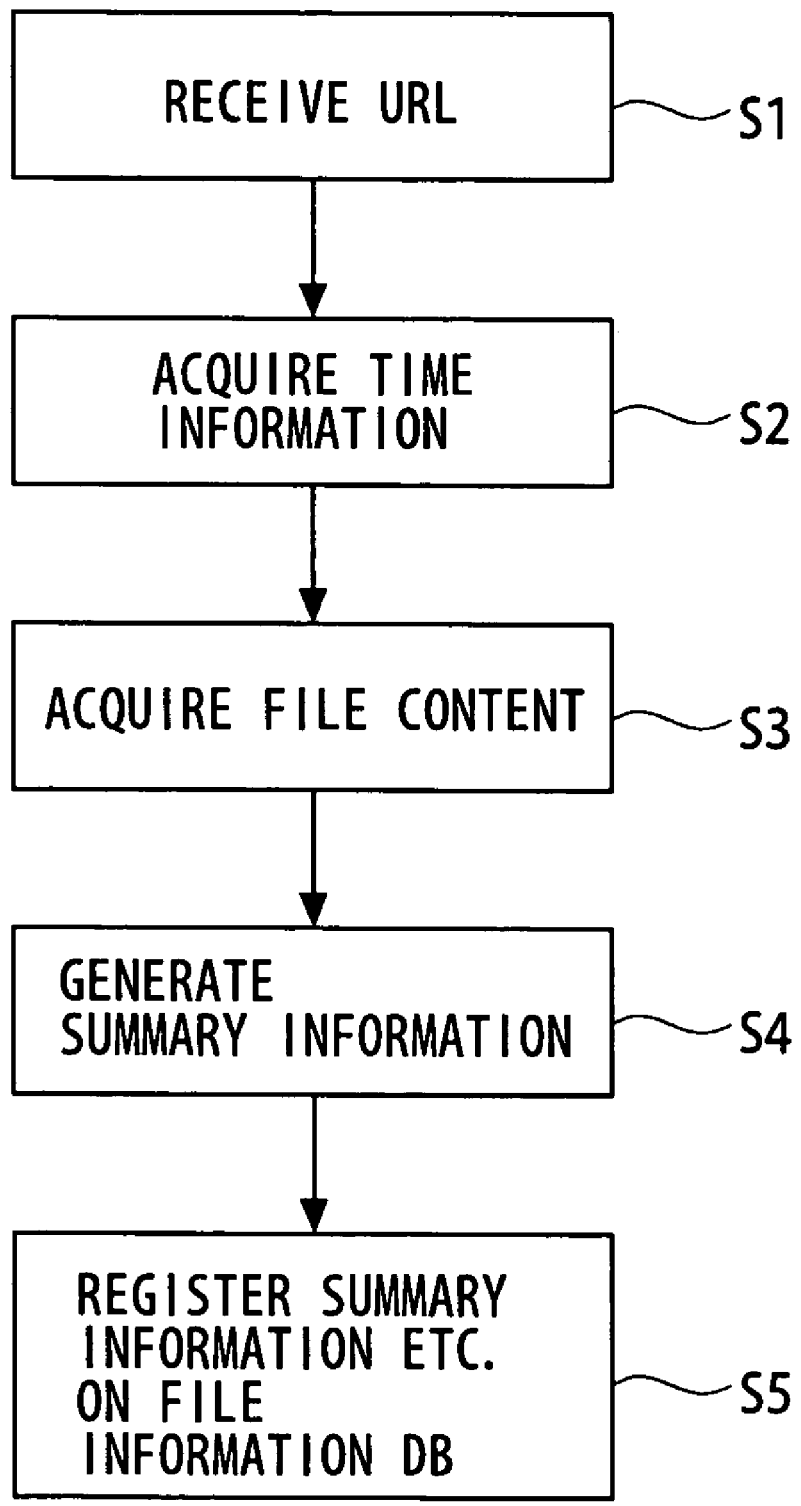
FIG. 4 is an explanatory flowchart showing a procedure of registering, in the authentication server, a file opened to the public on a network.

FIG. 4 is an explanatory flowchart showing a procedure of registering the authentication server with the files that are opened to the public on the network. Further, the following numerals with a mark < > correspond to the numerals showing a flow of processing in FIG. 1.

<1> The requester (file creator) uploads the file created locally on the requester terminal to the Web server 2.

<2> Further, the requester accesses the authentication server 1 and notifies the server 1 of a URL of the file (the registration object file) requiring the authentication. In response to this, the authentication server 1 receives the URL through a function as an address receiving means (step 1, which will hereinafter be abbreviated such as S1).

<3> The authentication server 1, through functions as the timestamp acquisition module and the file acquisition module, accesses the Web server 2 on the basis of the URL, and acquires the last update timestamp of the file on the server 2 and a content of the file (S2, S3).

Further, the authentication server 1, through a function as the digest generation module, generates the digest information of the acquired file (S4), and registers the file information storage module with the address information, the timestamp information and the digest information (S5).

Thus, in the present embodiment, when the address information of the registration object file is transmitted from on the requester-side terminal 3, the authentication server 1 acquires the file based on this address information, and generates and registers the digest information, and hence a load on the side of the requester on the occasion of the registration is lessened.

3-2. Authentication Procedure

Figure 5:
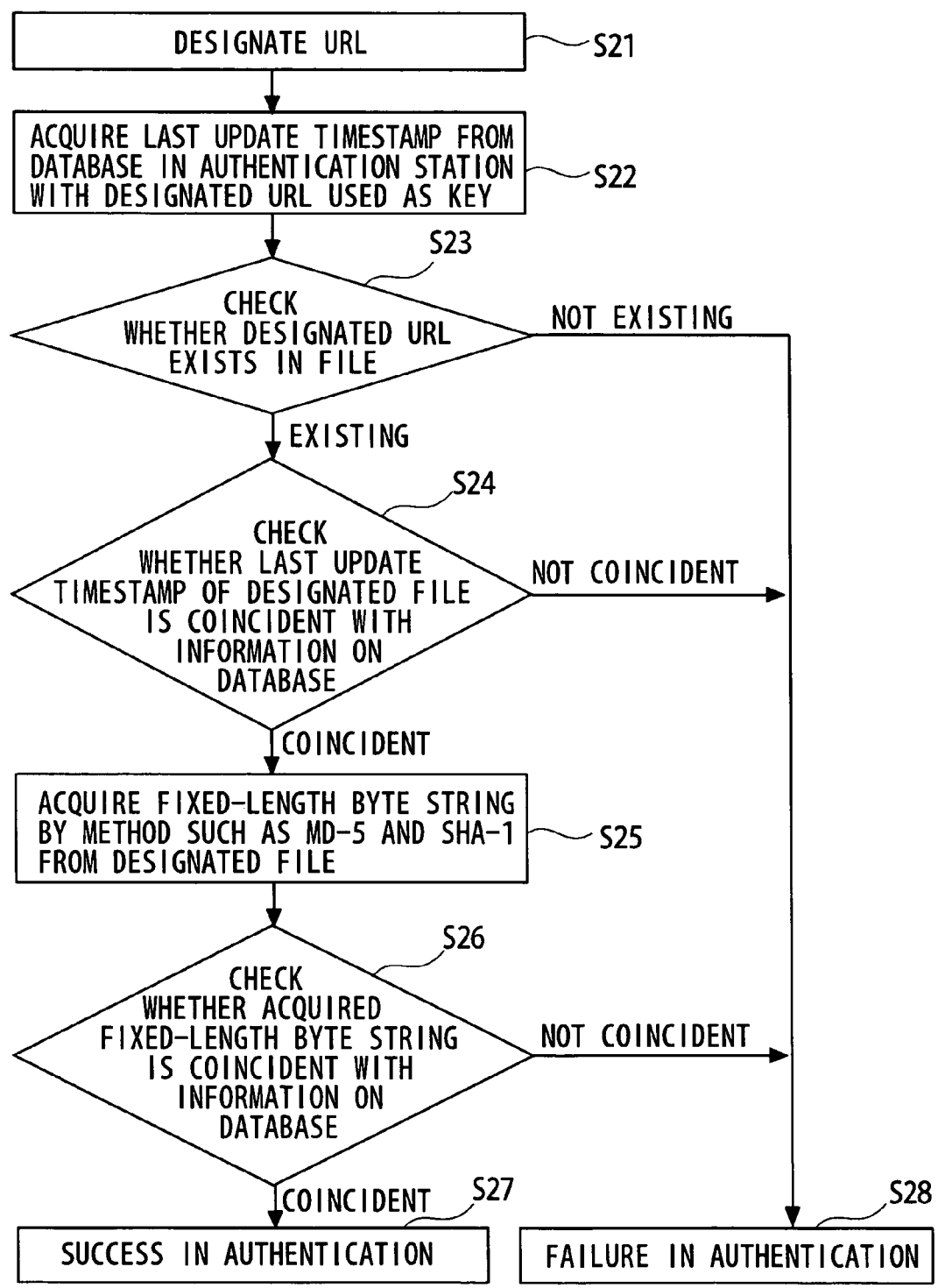
FIG. 5 is an explanatory flowchart showing a procedure of authenticating the file opened to the public on the network.

FIG. 5 is an explanatory flowchart showing a procedure of authenticating the file opened to the public on the network.

<4> An authentication user notifies, from on the user terminal 4, the authentication server 1 of the URL of the file requiring the authentication, i.e., the address information of the authentication object file. In response to this, the authentication server 1, through a function as the address receiving module, receives the URL from the user terminal 4 (S21), and acquires the timestamp information (the last update timestamp) from the file information DB on the basis of the URL (S22).

Next, the authentication server 1 checks whether the file specified by the designated URL exists or not (S23).

<5> If the file exists, the authentication server 1 accesses the Web server 2, acquires, through a function as the timestamp acquisition module, the last update timestamp of the authentication object file, and checks, through a function as the authentication module, whether or not the last update timestamp of this authentication object file is coincident with the last update timestamp registered on the file information DB (S24).

If these last update timestamps are coincident with each other, the authentication server 1, through a function as the file acquisition module, acquires the authentication object file from the Web server 2, and, through a function as the digest generation module, generates the digest information of the authentication object file (S25).

Then, the authentication server 1, through a function as the authentication module, searches, by using the URL of the authentication object file as a (search) key, the file information DB for the digest information so registered as to be associated with the same URL, and authenticates the file by comparing the registered digest information with the digest information of the authentication object file (S26).

<6> If these pieces of digest information are coincident with each other, the timestamp information of the file is sent (outputted) together with an authentication successful message to the user terminal (S27). Further, if there occur in steps 23, 24 and 26 events such as [none of the file specified by the designated URL exists], [the certification authority (CA) is not stored with any information associated with the designated URL] and [the file exists in the server, and the information exists in the storage area in the certification authority, however, no coincidence is verified as a result of collation], the user terminal 4 is notified of a message showing each of these purports (S28).

Note that the information is, on the premise of encrypting the information, transferred and received on the network, thus ensuring confidentiality of the information.

As discussed above, according to the present embodiment, it is possible to reduce the load occurred on the occasion of registering the digest information of the file in the authentication server and the load occurred on the occasion of demanding the authentication, thereby enabling the authentication to be facilitated.

§4. Modified Example

Modified Example 1

The embodiment described above has exemplified the case in which the registration object file and the authentication object file are stored in the same address, however, the present invention is not limited to this configuration.

For example, the requester notifies the authentication server 1 of the URL of the registration object file in the way described above and thus makes the registration, in which case the authentication server may be notified of the address of the file on the requester terminal serving as a source of uploading and may be requested to do the authentication (verification).

Namely, when the requester terminal 3 uploads the file to the Web server 2, this file is set accessible from other computers on the network, and the authentication server 1 is notified of the address of the uploaded registration object file together with the address of the file on this requester terminal 3.

The authentication server 1, when receiving the address of the file on this requester terminal 3 and the address of the registration object file, in the same way as above, acquires the file on the requester terminal 3, generates the digest information of this file and also the digest information of the registration object file, and compares these pieces of digest information with each other, thus making the authentication. Then, if these pieces of digest information are coincident with each other, this implies that the file is uploaded correctly, so that the authentication server 1 registers the digest information of the registration object file on the file information DB but does not, if these pieces of digest information are not coincident, register the digest information of the registration object file on the file information DB. This scheme makes it possible to check at the registration time whether the file to be registered is correctly uploaded or not.

Moreover, in this case, the authentication server 1, through the function as the timestamp acquisition module, acquires, as the timestamp information, the last update timestamp of the file and a file creation timestamp (locally) on the terminal 3, and may store these pieces of timestamp information on the file information DB in a way that associates the timestamp information with the digest information etc. With this scheme, it is feasible to provide the locally created timestamp and the last update timestamp when succeeding in the authentication.

Modified Example 2

The embodiment discussed above has exemplified the example, wherein both of the registration request and the demand for the authentication can be utilized by notifying the authentication server of the file address, however, the present invention is not limited to this exemplification and may be configured to utilize at least one of the registration request and the demand for the authentication.

For instance, the authentication server 1 receives the address of the registration object file, acquires the registration object file on the basis of this address, and generates and registers the digest information of this file. Then, in the same way as the conventional manner, the user terminal 4 generates the digest information of the authentication object file and sends this digest information to the authentication server 1. The authentication server 1 receiving the digest information of the authentication object file, through the function as the authentication module, authenticates the file by comparing the digest information of the registration object file with the digest information of the authentication object file.

Even with this configuration, the load on the requester terminal 3 is reduced, and therefore the object of the present invention is accomplished.

Further, conversely to this configuration, the requester terminal 3 generates the digest information of the registration object file and sends this digest information to the authentication server 1. Then, the authentication server 1 receiving the digest information of the registration object file stores this information on the file information DB, acquires, when receiving the address of the authentication object file, the authentication object file on the basis of this address, then generates the digest information of this file, and authenticates the file by comparing this digest information with the digest information on the file information DB.

Even with this configuration, the load on the user terminal 4 is reduced, and hence the object of the present invention is accomplished.

Modified Example 3

In the embodiment discussed above, the file information DB may be configured as a database capable of storing history information.

FIG. 6 shows an example of the file information DB stored with the history information.

In this example, this file information DB is stored with, in addition the information on the file information DB in FIG. 3, a previous version update timestamp and a next version update timestamp as items of history information.

In this example, the authentication server 1, when registering the digest information of the registration object file and the address information (URL) thereof and if the same URL has already been registered, extracts the latest version in the data (records) registered in association with this same URL, stores the present timestamp (the registration timestamp of this time) in a next version registration timestamp (field) of the latest version, and stores the registration timestamp of the version preceding thereto in the previous version registration timestamp of the version to be registered afresh. Furthermore, a special timestamp such as [1970-01-01 00:00:00] indicating an invalidity timestamp is set in the field of the next version registration timestamp in the latest version. Moreover, similarly, the invalidity timestamp is set in the field of the previous version update timestamp of the first version.

Accordingly, when receiving the URL of the authentication object file, the authentication server 1 searches through the file information DB with the URL used as a key, thus extracts the latest version that is the version where the invalidity timestamp is set in the next version registration timestamp in the plurality of extracted versions, and utilizes the latest version for the authentication. Then, when outputting an authentication result, the history information is extracted and can be provided as information showing an update frequency.

Moreover, the requester terminal 3 or the user terminal 4 generates the digest information of the file uploaded in the past, then transmits this digest information and a URL of an upload destination to the authentication server 1, and demands the authentication, in which case the authentication server lm through the function as the authentication module, searches through the file information DB with this URL used as a key, compares the digest information of the extracted version with the digest information of the file registered in the past, and thus authenticates the file. Then, the authentication server 1, through the function as the authentication result output module, sends the timestamp information etc. of the coincident version to the authentication demander terminal.

With this contrivance, it is possible to verify when and which address the file was opened to the public in, with respect to the files uploaded and registered in the authentication server 1 in the past but not yet opened to the public at the present.

§5. Readable-by-Computer Storage Medium

The authentication program is stored on a storage medium and may be thus provided. The program on this storage medium is read and executed by a computer, whereby the authentication can be effected by actualizing the functions of the program.

Herein, the storage medium readable by the computer, etc. connotes a storage medium capable of storing information such as data and programs electrically, magnetically, optically, mechanically or by chemical action, which can be read from the computer and so on. Among these storage mediums, for example, a flexible disc, a magneto-optic disc, a CD-ROM, a CD-R/W, a DVD, a DAT, an 8 mm tape, a memory card, etc. are given as those demountable from the computer.

Further, a hard disc, a ROM (Read-Only Memory), etc. are given as the storage mediums fixed within the computer.

As discussed above, according to the present invention, it is feasible to reduce the load occurred on the occasion of registering the digest information of the file in the authentication server and the load occurred on the occasion of demanding the authentication, whereby the authentication can be facilitated.

What is claimed is:

1. An authentication device comprising:
an address receiving module receiving address information of a registration object file;
a file acquisition module acquiring the registration object file on the basis of the address information;
a timestamp acquisition module acquiring timestamp information of the registration object file;
a digest generation module generating digest information of the registration object file acquired by said file acquisition module;
a file information registration module registering the digest information and the timestamp information in a way that associates the digest information and the timestamp information with each other;
an authentication module authenticating, in response to a demand for authentication, an authentication object file by comparing digest information of the authentication object file with the digest information registered in said file information registration module; and
an authentication result output module outputting, when authenticated by said authentication module, the timestamp information registered in said file information registration module, associated with the digest information compared.

2. The authentication device according to claim 1, wherein said file information registration module stores the digest information, the timestamp information and the address information of the registration object file in a way that associates these items of information with each other, and
said authentication module authenticates the authentication object file by comparing the digest information registered in said file information registration module in a way that associates the digest information with the same address information as the authentication object file has, with the digest information of the authentication object file.

3. The authentication device according to claim 1, wherein said file information registration module stores the digest information, the timestamp information and the address information of the registration object file in a way that associates these items of information with each other, and
if the address information of the registration object file has already been registered in said file registration module, history information is registered together with the address information, the timestamp information and the digest information.

4. An authentication device comprising:
a file information registration module registering digest information of a registration object file and timestamp information of the registration object file in a way that associates the digest information and the timestamp information with each other;
an address receiving module receiving address information of an authentication object file;
a file acquisition module acquiring the authentication object file on the basis of the address information;
a digest generation module generating digest information of the authentication object file acquired by said file acquisition module;
an authentication module authenticating the authentication object file by comparing the digest information of the authentication object file with the digest information registered in said file information registration module; and
an authentication result output module outputting, when authenticated by said authentication module, the timestamp information registered in said file information registration module, associated with the digest information compared.

5. The authentication device according to claim 4, wherein said file information registration module stores the digest information, the timestamp information and the address information of the registration object file in a way that associates these items of information with each other, and
said authentication module authenticates the authentication object file by comparing the digest information registered in said file information registration module in a way that associates the digest information with the same address information as the authentication object file has, with the digest information of the authentication object file.

6. The authentication device according to claim 4, wherein said file information registration module stores the digest information, the timestamp information and the address information of the registration object file in a way that associates these items of information with each other, and
if the address information of the registration object file has already been registered in said file registration module, history information is registered together with the address information, the timestamp information and the digest information.

7. An authentication device comprising:
an address receiving module receiving address information of a registration object file or an authentication object file;
a file acquisition module acquiring any one of the registration object file and the authentication object file on the basis of the address information;
a timestamp acquisition module acquiring timestamp information of the registration object file;
a digest generation module generating digest information of any one of the registration object file and the authentication object file acquired by said file acquisition module;
a file information registration module registering the digest information of the registration object file and the timestamp information thereof in a way that associates the digest information and the timestamp information with each other;
an authentication module authenticating the authentication object file by comparing the digest information of the authentication object file with the digest information registered in said file information registration module; and
an authentication result output module outputting, when authenticated by said authentication module, the timestamp information registered in said file information registration module, associated with the digest information compared.

8. The authentication device according to claim 7, wherein said file information registration module stores the digest information, the timestamp information and the address information of the registration object file in a way that associates these items of information with each other, and
said authentication module authenticates the authentication object file by comparing the digest information registered in said file information registration module in a way that associates the digest information with the same address information as the authentication object file has, with the digest information of the authentication object file.

9. The authentication device according to claim 7, wherein said file information registration module stores the digest information, the timestamp information and the address information of the registration object file in a way that associates these items of information with each other, and
if the address information of the registration object file has already been registered in said file registration module, history information is registered together with the address information, the timestamp information and the digest information.

10. An authentication method by which a computer executes:
receiving address information of a registration object file;
acquiring the registration object file on the basis of the address information; acquiring timestamp information of the registration object file;
generating digest information of the registration object file acquired;
registering the digest information and the timestamp information in a file registration module in a way that associates the digest information and the timestamp information with each other;
authenticating, in response to a demand for authentication, an authentication object file by comparing the digest information of the authentication object file with the digest information registered in said file information registration module; and
outputting, when authenticated by comparing the digest information, the timestamp information registered in said file information registration module, associated with the digest information compared.

11. The authentication method according to claim 10, wherein said file information registration module stores the digest information, the timestamp information and the address information of the registration object file in a way that associates these items of information with each other, and said authenticating includes authenticating the authentication object file by comparing the digest information registered in said file information registration module in a way that associates the digest information with the same address information as the authentication object file has, with the digest information of the authentication object file.

12. The authentication method according to claim 10, wherein said file information registration module stores the digest information, the timestamp information and the address information of the registration object file in a way that associates these items of information with each other, and said registering the digest information includes registering, if the address information of the registration object file has already been registered in said file registration module, history information together with the address information, the timestamp information and the digest information.

13. An authentication method executed by a computer including a file information registration module registering digest information of a registration object file and timestamp information of the registration object file in a way that associates the digest information and the timestamp information with each other, the authentication method comprising;

receiving address information of an authentication object file;

acquiring the authentication object file on the basis of the address information;

generating digest information of the authentication object file acquired;

authenticating the authentication object file by comparing the digest information of the authentication object file with digest information registered in the file information registration module;

outputting, when authenticated by said authentication module, the timestamp information registered in said file information registration module, associated with the digest information compared.

14. The authentication method according to claim 13, wherein said file information registration module stores the digest information, the timestamp information and the address information of the registration object file in a way that associates these items of information with each other, and said authenticating involves authenticating the authentication object file by comparing the digest information registered in said file information registration module in a way that associates the digest information with the same address information as the authentication object file has, with the digest information of the authentication object file.

15. The authentication method according to claim 13, wherein said file information registration module stores the digest information, the timestamp information and the address information of the registration object file in a way that associates these items of information with each other, and said file information registering module registering, if the address information of the registration object file has already been registered in said file registration module, history information together with the address information, the timestamp information and the digest information.

16. An authentication method by which a computer executes:

receiving address information of a registration object file or an authentication object file;

acquiring any one of the registration object file and the authentication object file on the basis of the address information;

acquiring timestamp information of the registration object file;

generating digest information of any one of the registration object file and the authentication object file acquired;

registering the digest information of the registration object file and the timestamp information in a file information registration module in a way that associates the digest information and the timestamp information with each other;

authenticating the authentication object file by comparing the digest information of the authentication object file with the digest information registered in the file information registration module; and outputting, when authenticated by comparing the digest information, the timestamp information registered in the file information registration module and associated with the digest information compared.

17. A recording medium recorded with an authentication program making a computer execute:

receiving address information of a registration object file;

acquiring the registration object file on the basis of the address information; acquiring timestamp information of the registration object file;

generating digest information of the registration object file acquired;

registering the digest information and the timestamp information in a file registration module in a way that associates the digest information and the timestamp information with each other;

authenticating, in response to a demand for authentication, an authentication object file by comparing the digest information of the authentication object file with the digest information registered in said file information registration module; and outputting, when authenticated by comparing the digest information, the timestamp information registered in said file information registration module, associated with the digest information compared.

18. A recording medium recorded with an authentication program making a computer, including a file information registration module registering digest information of a registration object file and timestamp information of the registration object file in a way that associates the digest information and the timestamp information with each other, execute:

receiving address information of an authentication object file;

acquiring the authentication object file on the basis of the address information;

generating digest information of the authentication object file acquired;

authenticating the authentication object file by comparing the digest information of the authentication object file with the digest information registered in the file information registration module;

outputting, when authenticated by comparing the digest information, the timestamp information registered in said file information registration module, associated with the digest information compared.

19. A recording medium recorded with an authentication program making a computer execute:

receiving address information of a registration object file or an authentication object file;

acquiring any one of the registration object file and the authentication object file on the basis of the address information;

acquiring timestamp information of the registration object file;

generating digest information of any one of the registration object file and the authentication object file acquired;

registering the digest information of the registration object file and the timestamp information in a file information registration module in a way that associates the digest information and the timestamp information with each other;

authenticating the authentication object file by comparing the digest information of the authentication object file with the digest information registered in the file information registration module; and outputting, when authenticated by comparing the digest information, the timestamp information registered in said file information registration module, associated with the digest information compared.

* * * * *